US011791916B2

(12) United States Patent
Premji et al.

(10) Patent No.: US 11,791,916 B2
(45) Date of Patent: Oct. 17, 2023

(54) USING SIGNAL QUALITY PARAMETERS TO ADJUST DATA PROPAGATION METRICS

(71) Applicant: Arista Networks, Inc., Santa Clara, CA (US)

(72) Inventors: Ariff Premji, Woodinville, WA (US); Manikandan Arumugam, Sunnyvale, CA (US); Urvish Mukundbhai Panchal, Woodinville, WA (US); Hacene Chaouch, Woodinville, WA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 162 days.

(21) Appl. No.: 17/199,547

(22) Filed: Mar. 12, 2021

(65) Prior Publication Data

US 2022/0294546 A1 Sep. 15, 2022

(51) Int. Cl.
*H04B 17/309* (2015.01)
(52) U.S. Cl.
CPC .................................. *H04B 17/309* (2015.01)
(58) Field of Classification Search
CPC ..................................................... H04B 17/309
See application file for complete search history.

(56) References Cited

U.S. PATENT DOCUMENTS

| 7,499,459 | B1 * | 3/2009 | Scudder | .................. | H04L 45/02 370/389 |
| 2003/0123446 | A1 * | 7/2003 | Muirhead | ........... | H04L 41/5009 370/392 |
| 2020/0389239 | A1 * | 12/2020 | Garcia | .................. | H04L 1/0009 |

\* cited by examiner

*Primary Examiner* — Natasha W Cosme
(74) *Attorney, Agent, or Firm* — Sprinkle IP Law Group

(57) ABSTRACT

Embodiments described herein relate to techniques for dynamically adjusting information propagation metrics for information propagation paths of network devices based on signal quality. Such techniques may include: obtaining a signal quality parameter for an interface of a network device; making a first determination, using the signal quality parameter, that a signal quality for an information propagation path using the interface is below a signal quality threshold; making a decision, by a signal quality analyzer and based on the first determination, to adjust an information propagation metric by an information propagation metric quantity; providing, by the signal quality analyzer, the information propagation metric quantity to an information propagation decision making device; and programming, by the information propagation decision making device, a new information propagation path that does not include the interface into a hardware component of the network device based on receiving the information propagation metric quantity.

20 Claims, 3 Drawing Sheets

USING SIGNAL QUALITY PARAMETERS TO ADJUST DATA PROPAGATION METRICS

BACKGROUND

Data is often transferred between and/or within devices in a network. Network devices in the data path between devices often receive the data with some number of errors relative to original data that was transmitted. Schemes exist to correct or otherwise mitigate the impact of such errors. However, such schemes may result in the degrading signal quality seen at an interface (external or internal) of a network device being mitigated until the interface is no longer effectively functional (e.g., the interface shuts down). Such behavior may lead to the continued use of an interface at which signal quality degradation is happening, which may lead, for example, to increasing packet loss and, once the interface stops effectively functioning, forcing the network to re-converge to use a new data path to avoid the interface.

DETAILED DESCRIPTION

Figure 1:
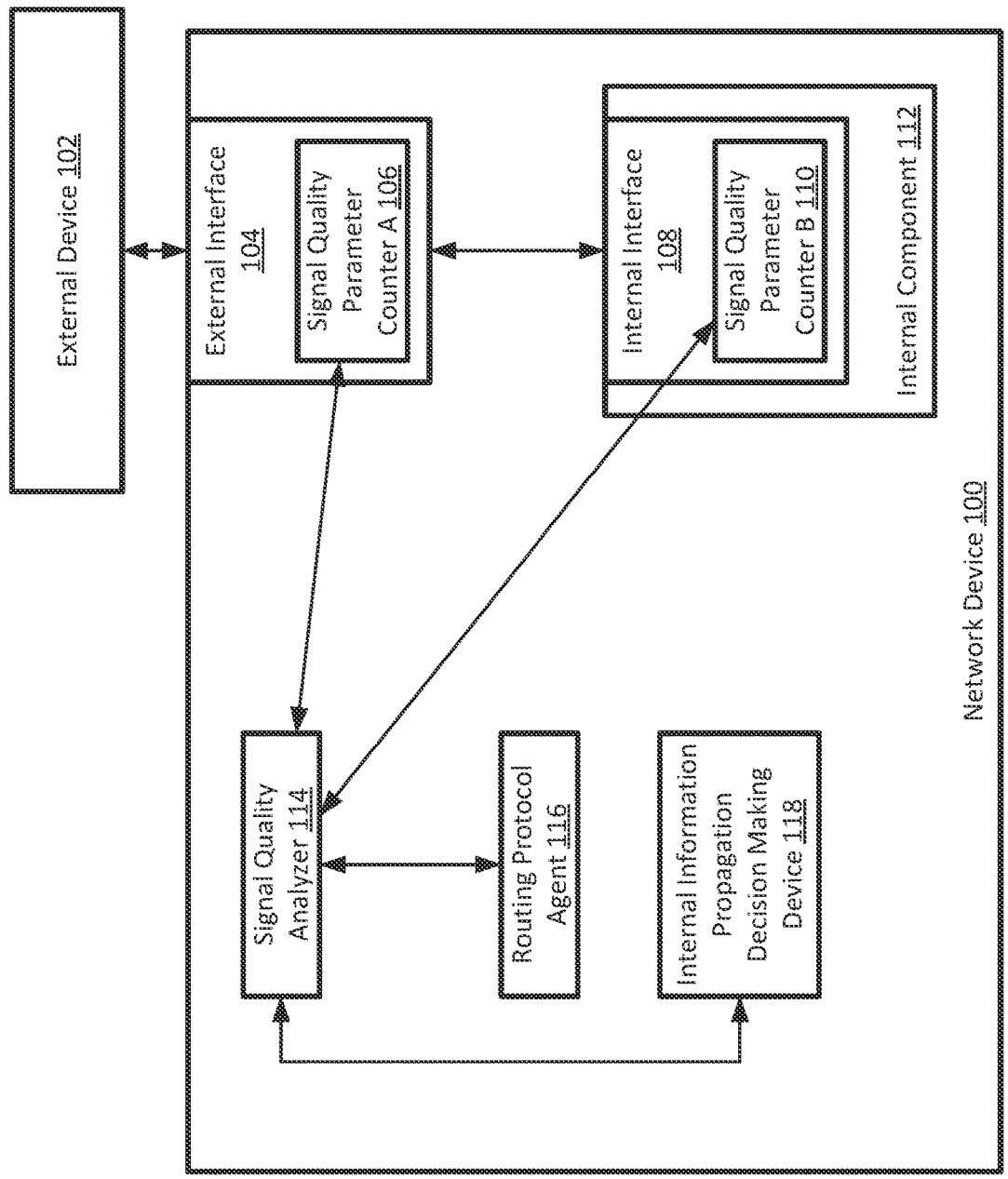
FIG. 1 shows a system for adjusting information propagation decisions based on signal quality in accordance with one or more embodiments described herein.

Specific embodiments will now be described with reference to the accompanying figures.

In general, embodiments described herein relate to techniques for adjusting information propagation metrics to influence selection of information propagation paths based on signal quality at network device interfaces. Specifically, in one or more embodiments, signal quality parameters are measured to determine signal quality. In one or more embodiments, when the signal quality parameter indicates that the signal quality at a given interface of a network device has fallen below a pre-defined threshold, steps are taken to adjust one or more information propagation metrics to influence whether a route using the interface will continue to be used as part of an information propagation path.

Information that is transmitted is often received at network devices with some number of errors. Additionally or alternatively, some number of errors may arise within the network device as information is propagated between components therein. Schemes for mitigating the impact of such errors (e.g., forward error correction (FEC)) may exist at multiple locations within the network device (e.g., at an external interface, at an internal interface, etc.), and may help correct some or all of the errors.

However, such error correction may have the effect of masking the underlying problem that the signal quality on a given interface is degraded, and may be degrading more over time. Eventually, the signal on a given interface may degrade to a point where the interface is effectively (or actually) down.

In such a scenario, entities (e.g., routing protocol agents) may be forced to re-calculate the best path (e.g., route) to get to destinations that the interface which is now down was previously used to reach, and/or the network may be forced to re-converge.

Embodiments described herein address the aforementioned problem by proactively monitoring signal quality parameters (e.g., the bit error rate (BER)) for interfaces of a network device prior to the application of error mitigation or correction schemes, such as, for example FEC (i.e., pre-FEC BER). In one or more embodiments, an increasing number of errors (e.g., increasing pre-FEC BER) corresponds to an increasingly degraded signal seen on the interface for which the quantity of errors (e.g., pre-FEC BER) is measured. In one or more embodiments, a signal quality analyzer may be operatively connected to one or more signal quality parameter counters (e.g., pre-FEC BER counters) for any or all interfaces, external or internal, of a network device. In one or more embodiments, such interfaces (e.g., optical interfaces) may provide a connection to an external device. In one or more embodiments, other interfaces (e.g., copper connections) may provide a connection between components within a network device. In one or more embodiments, both external and internal interfaces may have a signal quality parameter counter (e.g., a pre-FEC BER counter) that quantifies errors seen in the signal before any error correction or mitigation scheme occurs at that point in an information propagation path (e.g., when a signal is received from an external device, when a signal is received at a component of a network device from another component of the network device, etc.).

The signal quality analyzer may be programmed with any number of thresholds relating to signal quality. For example, the signal quality analyzer may be programmed with thresholds of the number of bit errors per quantity of bits or in a given period of time. Each threshold may be associated with a quantity by which to adjust a given information propagation metric. For example, the Intermediate System to Intermediate System (ISIS) routing protocol selects winning routes based, at least in part, on the cost of the possible routes to a given destination, with the lowest cost route winning. The default metric value for ISIS is 10, which is added to route metrics from other hops along a route to determine route cost. In such an example, in the event that the signal analyzer determines that a pre-FEC BER for an external interface is high enough to have crossed a threshold, thereby indicating degraded signal quality at the interface, the signal analyzer may cause an adjustment of the ISIS metric for routes using the interface (e.g., 3 may be added to the default of 10).

In one or more embodiments, as an error quantity at a given interface (e.g., the pre-FEC BER) increases, each threshold that is breached may cause a greater adjustment of the relevant metric. In this example, the ISIS protocol agent that is choosing winning routes to install in a routing information base (RIB) (and ultimately a forwarding information base (FIB)) will use the adjusted route metric when selecting winning routes, and increasing the metric increases the chance that a route using the interface at which the signal degradation is observed will not be the winning route. In one or more embodiments, at the point that the route is no longer the winning route, the route using the interface is replaced with a different route with better signal quality. Therefore, in one or more embodiments, the route change occurs before that interface goes down, which may lead to less packet loss, and faster convergence times.

FIG. 1 shows a system in accordance with one or more embodiments described herein. As shown in FIG. 1, the system includes external device (102) and network device (100). Network device (100) may include external interface (104), which may include and/or be operatively connected to signal quality parameter counter A (106). Network device (100) may also include internal component (112), which may include and/or be operatively connected to internal interface (108) and signal quality parameter counter B (110). Network device (100) may also include signal quality analyzer (114), routing protocol agent (116), and internal information propagation decision making device (118). Each of these components is described below.

In one or more embodiments, network device (100) is a device that includes and/or is operatively connected to persistent storage (not shown), memory (e.g., random access memory (RAM)) (not shown), one or more processor(s) (e.g., integrated circuits) (not shown), and at least one physical network interface (e.g., external interface (104)) (which may also be referred to as a port), which may provide connections (i.e., links) to other devices (e.g., computing devices, other network devices, etc.). In one or more embodiments, network device (100) also includes any number of additional components (not shown), such as, for example, network chips, field programmable gate arrays (FPGAs), application specific integrated circuits (ASIC s), indicator lights (not shown), fans (not shown), etc. Network device (100) may include any other components without departing from the scope of embodiments described herein.

In one or more embodiments, network device (100) includes any software configured to perform various functions of the network device (e.g., to process packets). Such software may, for example, execute using one or more processors of a network device, or any other hardware resource of a network device capable of executing software.

Examples of a network device, such as network device (100) include, but are not limited to, a network switch, a router, a multilayer switch, a fibre channel device, an InfiniBand® device, etc. A network device is not limited to the aforementioned specific examples.

In one or more embodiments, network device (100) includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Such a series of lookups and corresponding actions may be referred to as a pipeline, and may be, for example, programmed as a match-action pipeline. Examples of pipeline processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device.

In one or more embodiments, network device (100) is part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, a network may be coupled with or overlap, at least in part, with the Internet. In one or more embodiments, a network includes a collection of one or more devices (e.g., network devices) that facilitate network connectivity for one or more operatively connected devices (e.g., computing devices, data storage devices, other network devices, etc.) (not shown). In one or more embodiments, a network device and other devices within the network are arranged in a network topology (not shown). In one or more embodiments, a network topology is an arrangement of various devices of a network.

In one or more embodiments, the persistent storage and/or memory (not shown) of network device (100) may be or include one or more data repositories for storing any number of data structures storing any amount of data (i.e., information). In one or more embodiments, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, the persistent storage and/or memory of network device (100) may be considered, in whole or in part, as non-transitory computer readable mediums storing, at least in part, software and/or firmware.

Such software and/or firmware may include instructions which, when executed by the one or more processors (not shown) or other hardware (e.g. circuitry) of network device (100), cause the one or more processors and/or other hardware components to perform operations in accordance with one or more embodiments described herein.

Such software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one or more embodiments, network device (100) includes at least one external interface (e.g., external interface (104)). In one or more embodiments, external interface (104) is any hardware, software, or combination thereof that includes functionality to receive and or transmit network traffic data units or any other information to or from network device (100). External interface (104) may be any interface technology, such as, for example, optical, electrical, etc. External interface (104) may be configured to interface with any transmission medium (e.g., optical fiber, copper wire(s), etc.).

In one or more embodiments, external interface (104) includes and/or is operatively connected to any number of components used in the processing of network traffic data units. For example, external interface may include a PHY (not shown), which is circuitry that connects a physical information propagation medium (e.g., a wire) to other components which process the information. In one or more embodiments, external interface (104) includes and/or is operatively connected to a transceiver, which provides the connection between the physical information transmission medium and the PHY. A PHY may also include other components, such as a serializer/deserializer (SERDES), and encoder/decoder, etc. A PHY may, in turn, be operatively connected to other components, such as, for example, a media access control (MAC) sublayer. Such a sublayer, may, in turn, be operatively connected to still other higher layer processing components, all of which form a series of components used in the processing of network traffic data units being received or transmitted.

In one or more embodiments, external interface (104) includes one or more components configured to perform forward error correction (FEC). In one or more embodiments, FEC is an error correction technique to detect and correct some number of errors in a data stream, which may require transmitted data to include an overhead of error correction code to let FEC-implementing components perform error correction without the need for the data having errors to be retransmitted.

In one or more embodiments, external interface (104) includes (as shown in FIG. 1) and/or is operatively connected to signal quality parameter counter A (106). In one or more embodiments, signal quality parameter counter A (106) is any hardware, software, firmware, or any combination thereof, that includes functionality to quantify in any way any signal quality parameter. In one or more embodiments, a signal quality parameter is any parameter that may be measured and used to provide information regarding the quality of a signal being received at external interface (104).

Such parameters may include, but are not limited to, optical signal parameters (e.g., signal to noise ratio), electrical signal parameters (e.g., phase, frequency, wavelength, etc.), bit error rate or ratio (BER), etc. In one or more embodiments, a bit error rate is the number of bit errors in a given data stream per any unit of time, and a bit error ratio is the number of bit errors per unit time divided by the total number of bits in the data stream in the same time interval. In one or more embodiments, signal quality parameter counter A (106) is configured to count or otherwise quantify the BER seen at external interface (104).

In one or more embodiments, bit errors in a data stream received at external interface (104) may be corrected using one or more FEC components. However, in one or more embodiments, signal quality parameter counter A (106) is configured to quantify the BER prior to any FEC application. In one or more embodiments, the BER before any FEC is applied may be referred to as a pre-FEC BER. In one or more embodiments, the pre-FEC BER, or any other signal quality parameter, may be stored in any storage of network device (100), or any component therein, for any period of time and in any format (e.g., a set of bits representing a quantity of bit errors in a certain time period).

In one or more embodiments, network device (100) includes internal component (112), which may be operatively connected to external interface (104) and/or to any other component of network device (100). In one or more embodiments, internal component (112) is any component in network device (100) that exists in a path that information received by or to be transmitted from network device (100) travels within network device (100).

For example, internal component (112) may be a network chip, FPGA, ASIC, line card, etc. In one or more embodiments, internal component (112) may receive data from an external interface (e.g., external interface (104)) or any other internal component (not shown), and process the information, which may include adding to the information, editing or otherwise transforming the information, causing the information to be discarded, preparing the information of further transmission, transmitting the information to another component, etc.

In one or more embodiments, internal component (112) includes one or more internal interfaces (e.g., internal interface (108)). Internal interface (108) may be any interface for receiving and/or transmitting data for internal component (112). Internal interface (108), like external interface (104), may be any interface technology, such as, for example, optical, electrical, etc. Internal interface (108) may be configured to interface with any transmission medium (e.g., optical fiber, copper wire(s), etc.).

In one or more embodiments, internal interface (108) includes and/or is operatively connected to signal quality parameter counter B (110). In one or more embodiments, signal quality parameter counter B (110) is any hardware, software, firmware, or any combination thereof, which includes functionality to quantify in any way any signal quality parameter. As an example, signal quality parameter counter B (110) may be a pre-FEC BER counter configured to quantify the pre-FEC bit errors seen at internal interface (108).

In one or more embodiments, network device (100) includes signal quality analyzer (114). In one or more embodiments, signal quality analyzer (114) is any hardware, software, firmware, or any combination thereof, that includes functionality to perform any type of analysis of signal quality based on any type of signal quality parameter. In one or more embodiments, signal quality analyzer (114) is operatively connected to signal quality parameter counter A (106) and signal quality parameter counter B (110). In one or more embodiments, signal quality analyzer (114) includes or has access to any number of signal quality thresholds.

For example, signal quality analyzer (114) may be an FPGA with storage in which is stored a set of signal quality thresholds against which signal quality parameters received from signal quality parameter counters may be compared. As another example, a signal quality threshold may be a quantity of bit errors per unit time seen on a given interface of network device (100).

In one or more embodiments, the thresholds of signal quality analyzer (114) are each associated with an information propagation metric quantity. In one or more embodiments, an information propagation metric quantity is a quantity that may be used to adjust an information propagation metric in order to influence decisions made by information propagation decision making devices regarding information propagation paths.

As an example, an information propagation metric quantity may be an integer value that is associated with a threshold which, when breached, triggers an addition of the information propagation metric quantity to a routing protocol metric, with the resulting new value being used during consideration of a best route to install in a routing information base (RIB) of network device (100).

In one or more embodiments, signal quality analyzer (114) includes functionality to pull signal quality parameters from the signal quality parameter counters (e.g., 106, 110), which may occur pursuant to a pre-defined schedule, be based on receipt of a command, or any other trigger for pulling data from another component. Additionally or alternatively, signal quality parameter counters (106, 110) may include functionality to provide signal quality parameters measured for interfaces (104, 108) of network device (100) to signal quality analyzer (114).

In one or more embodiments, network device (100) includes routing protocol agent (116), which may also be referred to as an information propagation decision making device. In one or more embodiments, an agent is any hardware (e.g., circuitry), software, firmware, or any combination thereof that includes functionality to perform any tasks or actions for which it was designed.

Examples of agent functionality include, but are not limited to: monitoring hardware; monitoring other software; monitoring log files; receiving information; parsing information; writing information (e.g., to hardware tables); performing repetitive tasks (e.g., data backup, memory management, etc.); providing an environment for a user to interact, locally or remotely, with hardware and/or software components of network device (100); automatically adding data to certain types of fields; performing management functions; simulating other software and/or hardware; sending and/or receiving signals (e.g., beacon signals) to determine if a device is still in contact with another device; any other task or action; processing/interpreting information; sending/distributing information; or any combination thereof.

Routing protocol agent (116) may be a process, or a part of a process, may include one or more threads within one or more processes, and/or may be capable of creating additional threads. Routing protocol agent (116) may be operatively connected to volatile storage devices and/or to non-volatile storage devices of network device (100). In one or more embodiments, routing protocol agent (116) executes within an operating system (not shown) using one or more processors (not shown) of network device (100).

In one or more embodiments, routing protocol agent (116) is an agent implementing a routing protocol. In one or more embodiments, a routing protocol is a protocol for managing route information in a network. For example, using a routing protocol, routing protocol agent (116) may learn route information (e.g., information propagation metrics) from neighbor network devices, store such route information, share route information (e.g., information propagation metrics) with other neighbor devices, provide candidate routes to a RIB agent for further processing, and/or request route information from other protocols from a RIB agent.

In one or more embodiments, routing protocol agent (116) includes functionality to execute a best path algorithm to select a best path based on information propagation metrics. For example, routing protocol agent (116) may be configured to select a route to install in a RIB from among a set of routes to a destination based on which route has a lowest administrative distance, lowest metric, etc. In one or more embodiments, the winner of a best route algorithm is influenced by having a relevant information propagation metric for the relevant protocol adjusted by the information propagation metric quantity generated by signal quality analyzer (114) based, at least in part, on a signal quality parameter received for a given interface of network device (100).

In one or more embodiments, an information propagation metric (administrative distance, metric, etc.) is an alpha-numeric unit (e.g., a number) assigned to a route, and may be based on any information relating to a route. As an example, the ISIS routing protocol uses a default metric value of 10 for interfaces of network device (100), and selects a best route to install in a RIB based on an aggregate metric value of all outgoing interfaces on the path to the destination for the route being the lowest from among the route candidates to that destination. In one or more embodiments, information propagation metrics may be adjusted (e.g., using the information propagation metric quantity generated by signal quality analyzer (114)), which influences whether a route for which such an adjustment occurs becomes the resulting winner of routing protocol agent (116) executing a best path selection algorithm.

In one or more embodiments, information propagation metrics that have been adjusted by an information propagation metric quantity on a given network device are shared with other network devices as part of the information sharing scheme used for implementing a given routing protocol. As such, in one or more embodiments, adjusting an information propagation metric using an information propagation metric quantity on one network device potentially influences best path algorithm winning routes on other network devices implementing routing protocols in common with the network device on which said adjustment was made.

As an example, network device (100) may implement the ISIS routing protocol. On network device (100), based on a high pre-FEC BER seen at external interface (104), the ISIS metric for routes using that interface may be adjusted by adding a numerical quantity of 8 to the ISIS metric. Such an addition may influence whether a route so adjusted is or remains the winning route after execution of a best path selection algorithm by an ISIS agent executing on network device (100). Additionally, the ISIS agent of network device (100) may share the updated ISIS metric value, including the addition, with external device (102), which is an ISIS neighbor. Based on the updated ISIS metric value received from network device (100), an ISIS agent executing on external device (102) may also use the updated ISIS metric when executing an ISIS best path algorithm, which may influence whether one or more routes are winning routes on external device (102).

For example, if an ISIS agent would select route A, having a default metric value of 10, as the best path, adding an information propagation metric quantity of 5 to the value of ten, making the metric for the interface 15, then the route may no longer be the winner of the execution of the best path algorithm by the ISIS agent.

Examples of routing protocol agent (116) include, but are not limited to: a Border Gateway Protocol (BGP) agent; an Interior Gateway Protocol (IGP) agent (e.g., Open Shortest Path First (OSPF), Routing Information Protocol (RIP), Intermediate System to Intermediate System (ISIS), Enhanced Interior Gateway Routing Protocol (EIGRP), etc.); a static route agent, etc.

In one or more embodiments, network device (100) includes internal information propagation decision making device (118). In one or more embodiments, internal information propagation decision making device (118) is any hardware, software, firmware, of any combination thereof to make decisions related to propagation paths used for information within network device (100). For example, information, such as a network traffic data unit, may initially arrive at network device (100) at external interface (104), and ultimately be transmitted from network device (100) from an egress interface (not shown). However, in between the ingress and egress interfaces, the network traffic data unit, or any portion thereof, may be communicated between any number of internal components (e.g., internal component (112)), and there may be any number of possible paths through network device (100) to get from the ingress interface to the egress interface. In one or more embodiments, internal information propagation decision making device (118) is configured to determine, at least in part, which such paths should be used for information propagating within network device (100).

In one or more embodiments, external device (102) is any device, set of devices, portion of one or more devices, etc. that is operatively connected to network device (100) via external interface (104). In one or more embodiments, external device (102) communicates information to and/or receives information from network device (100). External device (102) may be another network device, a computing device, or any other device or set of devices capable of sending and/or receiving information, such as, for example, network traffic data units.

While FIG. 1 shows a configuration of components, other configurations may be used without departing from the scope of embodiments described herein. For example, a network device may be connected to any number of external devices. As another example, a network device may have any number of external interfaces, any number of internal interfaces, any number of routing protocol or other agents, etc. Accordingly, embodiments disclosed herein should not be limited to the configuration of devices and components shown in FIG. 1.

Figure 2:
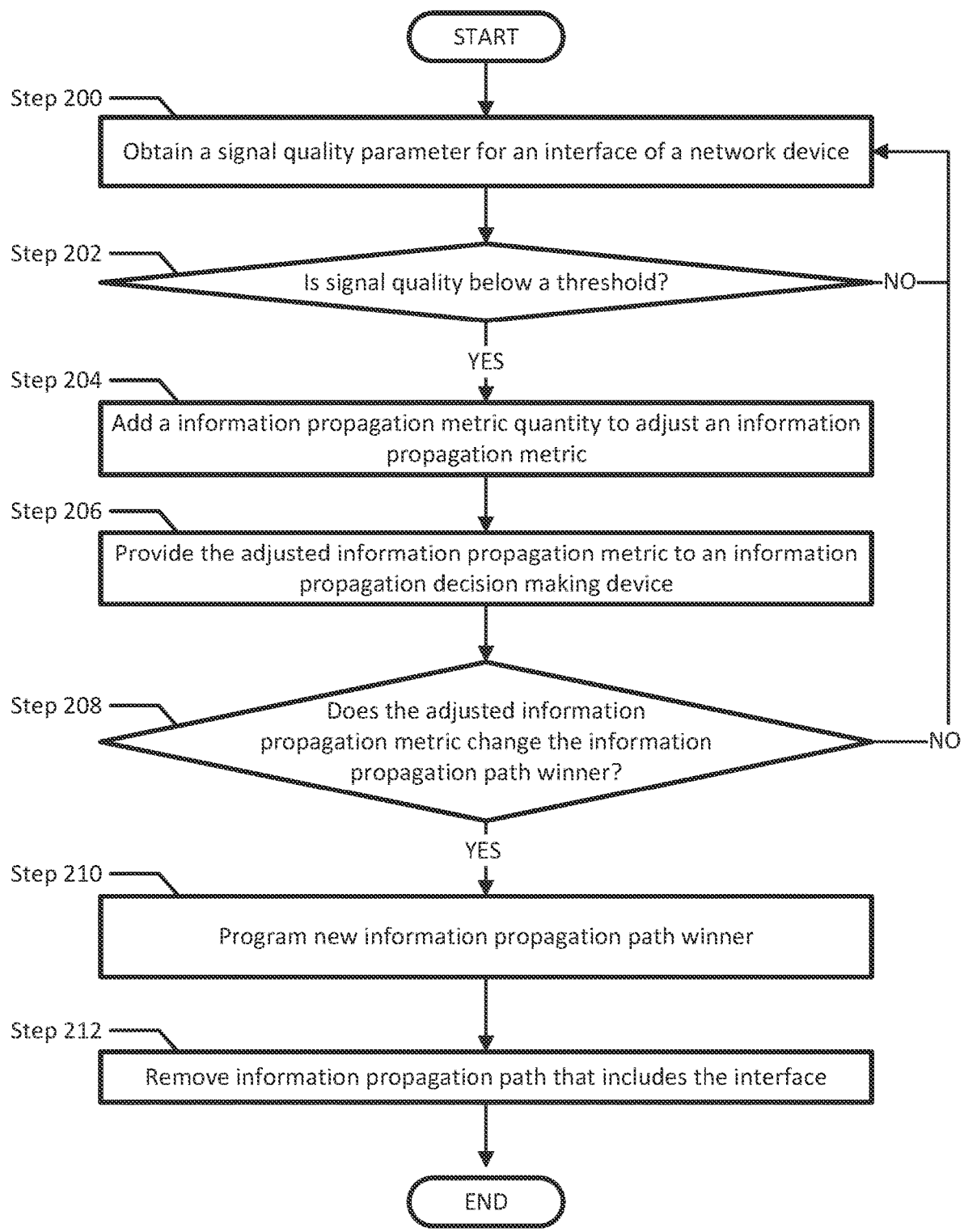
FIG. 2 shows a flowchart of a method for adjusting information propagation decisions based on signal quality in accordance with one or more embodiments described herein.

FIG. 2 shows a flowchart describing a method for dynamically adjusting information propagation metrics for information propagation paths of network devices based on signal quality in accordance with one or more embodiments described herein. The method for adjusting information propagation metrics shown in FIG. 2 is only one example of a particular scheme for adjusting information propagation metrics. Accordingly, embodiments described herein should not be considered limited to the process shown in FIG. 2.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, and/or that other steps than those shown in FIG. 2 may be performed.

In Step 200, a signal quality parameter is obtained for an interface of a network device. The interface may be an external interface or an internal interface. The signal quality parameter may be any quantity that can be used to assess the signal quality of a signal representing information that is received at the interface, such as, for example, a pre-FEC BER. In one or more embodiments, the signal quality parameter is obtained by a signal quality parameter counter, which may obtain signal quality parameters for one or more interfaces at any recurring interval. In one or more embodiments, the signal quality parameter is then provided to a signal quality analyzer.

In Step 202, a determination is made as to whether the signal quality at the interface is below a threshold. In one or more embodiments, a signal quality analyzer includes or otherwise has access to any number of thresholds, which are compared against the signal quality parameter obtained in Step 200. In one or more embodiments, the comparison determines whether the signal quality is below a signal quality threshold. As an example, if a pre-FEC BER of an interface is above a certain quantity threshold, then the signal quality analyzer determines that the signal quality seen at the interface has degraded below a signal quality threshold. In one or more embodiments, if the signal quality is not below a signal quality threshold, then the method returns to Step 200. In one or more embodiments, if the signal quality is below a signal quality threshold, then the method proceeds to Step 204.

In Step 204, based on the determination in Step 202 that the signal quality seen at an interface is below a signal quality threshold, an information propagation metric quantity is added to an information propagation metric. In one or more embodiments, the information propagation metric quantity is added to the information propagation metric by the signal quality analyzer. In one or more embodiments, the information propagation metric quantity is provided to another entity (e.g., a routing protocol agent, an internal information propagation decision making device), which adds the quantity to an information propagation metric. In one or more embodiments, each threshold available to a signal quality analyzer is associated with a different information propagation metric quantity.

In Step 206, either the information propagation metric quantity is provided to an information propagation decision making device (e.g., a routing protocol agent) to be added to the information propagation metric relevant to that device and the path to which the interface belongs, or, if the signal quality analyzer already performed the addition, the adjusted information propagation metric is provided to the information propagation decision making device for use when performing a best path algorithm to select a path along which information will propagate.

In Step 208, a determination is made as to whether the addition of the information propagation metric quantity to the information propagation metric changes the information propagation path winner.

For example, if a certain pre-FEC BER signal quality parameter is obtained, indicating that the signal quality at an interface has fallen below a first threshold, an ISIS metric quantity of 2 may be associated with the pre-FEC BER level, and thus be added to an ISIS default metric of 10 to increase the metric value to 12, thereby reducing the likelihood that the route using the interface will be the best path winner for the ISIS agent to a given destination. If an even higher pre-FEC BER signal quality parameter is obtained, indicating that the signal quality at an interface has fallen below a second threshold, an ISIS metric quantity of 7 may be associated with the pre-FEC BER level, and thus be added to an ISIS default metric of 10 to increase the metric value to 17, thereby reducing even further the likelihood that the route using the interface will be the best path winner for the ISIS agent to a given destination.

In one or more embodiments, the information propagation metric quantity is added to a base or default information propagation metric each time the addition occurs. In one or more embodiments, the information propagation metric quantity is added to the base or default metric the first time such an addition occurs, and subsequent additions are added to the new value, making the additions cumulatively raise the metric value used by the routing protocol agent, or internal information propagation decision making device.

In one or more embodiments, if the adjusted information propagation metric does not result in the information propagation path not being the winner (i.e., the path still wins), the method returns to Step 200. In one or more embodiments, if the information propagation path is no longer the best path winner, the method proceeds to Step 210.

In Step 210, a new alternate path to the destination of the information is programmed into whatever hardware is used to determine how information will propagate. For example, if the information propagation path is a route, and the route no longer is the winner of a best path algorithm execution, a different route is installed in a RIB of a network device.

In Step 212, the information propagation path for which the information propagation metric quantity was added to the information propagation metric is removed from any hardware or other location that would allow it to be selected as an information propagation path to use. For example, the route may be removed from a RIB and/or a FIB.

In one or more embodiments, although not shown in FIG. 2, after the information propagation path that includes the interface for which the signal was degraded is removed, the method may return to Step 200, where the signal quality parameter of the interface continues to be obtained. In one or more embodiments, if a determination is made, based on the obtained signal quality parameter values, that the interface is no longer degraded or less degraded, then the information propagation metric quantity that was previously added for the path may be reduced or eliminated. In such a scenario, in one or more embodiments, the information propagation path that includes the interface may again be selected as the best path after execution of a best path algorithm.

Figure 3:
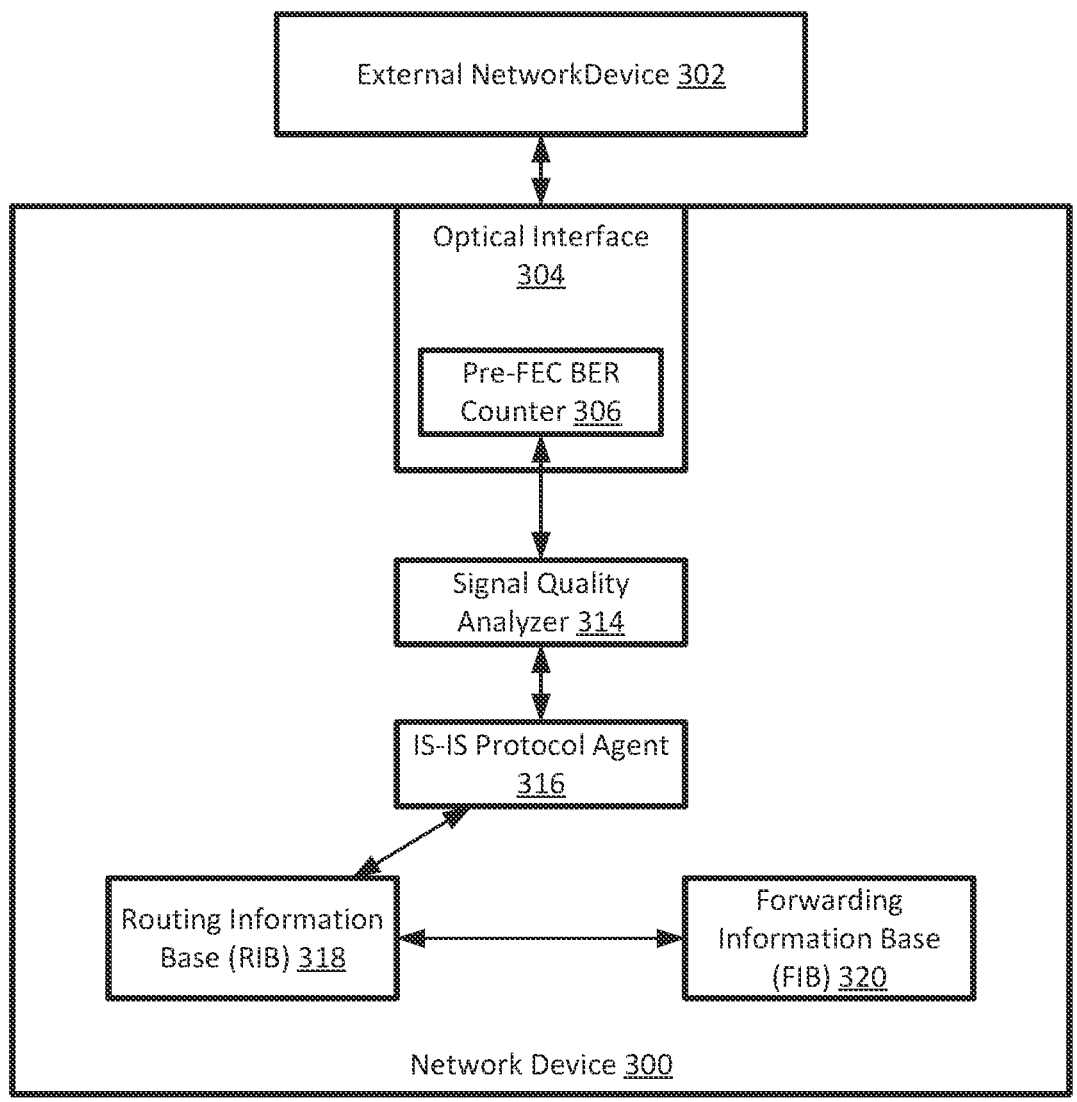
FIG. 3 shows an example in accordance with one or more embodiments of described herein.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 3, consider a scenario in which network device (300) includes optical interface (304) operatively connected to external network device (302), which transmits packets to network device (300) via optical interface (304). Network device (300) and external network device (302) are neighbors each implementing the ISIS routing protocol. Optical interface includes pre-FEC BER counter (306), which obtains and stores the pre-FEC BER of the signal of information received at optical interface (304). Pre-FEC BER counter (306) is operatively connected to signal quality analyzer (314). Signal quality analyzer (314) is operatively connected to ISIS protocol agent (316). ISIS protocol agent (316) is operatively connected to RIB (318), which, in turn, is operatively connected to forwarding information base (FIB) (320). A path to a destination that includes optical interface (304) is currently installed as a best path in RIB (318), and, consequently, FIB (320).

In such a scenario, a signal from external network device (302) that includes network traffic data units is received at optical interface (304). Pre-FEC BER counter (306) periodically determines the pre-FEC BER of the signal, and provides the pre-FEC BER value to signal quality analyzer (314). For a period of time, signal quality analyzer (314) determines that the pre-FEC BER does not indicate that the quality of the signal has fallen below any threshold known to the signal quality analyzer (314). However, at a certain time, the pre-FEC BER reaches a threshold level that signal quality analyzer (314) determines indicates that the signal has a significantly decreased quality. Therefore, signal quality analyzer (314) determines that the information propagation metric quantity associated with the threshold is 9, and adds 9 to the default ISIS metric of 10, resulting in an adjusted ISIS metric for optical interface (304) of 19.

Next, the adjusted ISIS metric of 19 associated with optical interface (304) is provided to ISIS protocol agent (316). The next time ISIS protocol agent (316) executes a best path selection algorithm to a destination on a path that includes optical interface (304), the metric of 19 is added to the metrics of all other outgoing interfaces on the path to the destination. As a result of the increased metric associated with optical interface (304), the route that includes optical interface (304) is no longer the winning route. Instead, an alternate is determined to be the winner by the ISIS protocol agent based on the execution of the best path algorithm Therefore, the alternate route is installed in RIB (318), and consequently programmed into FIB (320). The route that includes optical interface (304) is removed from both RIB (318) and FIB (320), thereby avoiding its use for receipt and transmission of future network traffic data units.

The removal of the route that includes optical interface (304) due to degraded signal quality, and the use of an alternate route instead, preemptively changes the route before any network traffic data units are dropped as a result of the degradation of the signal quality seen at optical interface (304). Additionally, convergence in the network that includes network device (300) has occurred proactively, before optical interface (304) effectively goes down, thereby avoiding the need to re-calculate paths when the interface goes down, re-programming the FIB at that time, which avoids potentially costly re-convergence events.

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While a limited number of embodiments have been described herein, those skilled in the art, having benefit of this disclosure, will appreciate that other embodiments can be devised which do not depart from the scope of the embodiments described herein. Accordingly, the scope of embodiments described herein should be limited only by the attached claims.

What is claimed is:

1. A method for dynamically adjusting information propagation metrics for information propagation paths of network devices based on signal quality, the method comprising:
  obtaining, by a signal quality analyzer, a signal quality parameter for an interface of a network device;

making a first determination, by the signal quality analyzer and using the signal quality parameter, that a signal quality for an information propagation path including the interface is below a signal quality threshold;

determining, by the signal quality analyzer and based on the first determination, an information propagation metric for adjusting an information propagation metric quantity;

providing, by the signal quality analyzer, the information propagation metric quantity to an information propagation decision making device; and programming, by the information propagation decision making device, a new information propagation path that does not include the interface into a hardware component of the network device based on receiving the information propagation metric quantity.

2. The method of claim 1, further comprising, before providing the information propagation metric quantity to the information propagation decision making device:

adding, by the signal quality analyzer, the information propagation metric quantity to the information propagation metric to obtain a new information propagation metric, wherein the information propagation metric quantity is provided to the information propagation decision making device as a portion of the new information propagation metric.

3. The method of claim 1, wherein the information propagation metric quantity is added to the information propagation metric by the information propagation decision making device to obtain a new information propagation metric.

4. The method of claim 1, wherein the signal quality parameter is a pre-forwarding error correction (pre-FEC) bit error rate (BER).

5. The method of claim 1, wherein the interface operatively connects the network device to an external device.

6. The method of claim 1, wherein the interface is an internal interface between components within the network device.

7. The method of claim 1, wherein the information propagation decision making device comprises a routing protocol agent.

8. The method of claim 1, wherein the signal quality analyzer is programmed to include a plurality of signal quality thresholds including the signal quality threshold, and each signal quality threshold of the plurality of signal quality thresholds corresponds to a different information propagation metric quantity.

9. A non-transitory computer readable medium comprising computer readable program code, which when executed by a computer processor enables the computer processor to perform a method for adjusting information propagation metrics for information propagation paths of network devices, the method comprising:

obtaining, by a signal quality analyzer, a signal quality parameter for an interface of a network device;

making a first determination, by the signal quality analyzer and using the signal quality parameter, that a signal quality for an information propagation path including the interface is below a signal quality threshold;

determining, by the signal quality analyzer and based on the first determination, an information propagation metric for adjusting an information propagation metric quantity;

providing, by the signal quality analyzer, the information propagation metric quantity to an information propagation decision making device; and programming, by the information propagation decision making device, a new information propagation path that does not include the interface into a hardware component of the network device based on receiving the information propagation metric quantity.

10. The non-transitory computer readable medium of claim 9, wherein the method performed by executing the computer readable program code further comprises, before providing the information propagation metric quantity to the information propagation decision making device:

adding, by the signal quality analyzer, the information propagation metric quantity to the information propagation metric to obtain a new information propagation metric, wherein the information propagation metric quantity is provided to the information propagation decision making device as a portion of the new information propagation metric.

11. The non-transitory computer readable medium of claim 9, wherein the information propagation metric quantity is added to the information propagation metric by the information propagation decision making device to obtain a new information propagation metric.

12. The non-transitory computer readable medium of claim 9, wherein the signal quality parameter is a pre-forwarding error correction (pre-FEC) bit error rate (BER).

13. The non-transitory computer readable medium of claim 9, wherein the interface operatively connects the network device to an external device.

14. The non-transitory computer readable medium of claim 9, wherein the interface is an internal interface between components within the network device.

15. The non-transitory computer readable medium of claim 9, wherein the information propagation decision making device comprises a routing protocol agent.

16. The non-transitory computer readable medium of claim 9, wherein the signal quality analyzer is programmed to include a plurality of signal quality thresholds including the signal quality threshold, and each signal quality threshold of the plurality of signal quality thresholds corresponds to a different information propagation metric quantity.

17. A system for adjusting metrics for information propagation paths, the system comprising:

a network device comprising:
a processor,
memory,
a storage device,
a signal quality analyzer, comprising circuitry, and configured to:
obtain a signal quality parameter for an interface of a network device;
make a first determination, using the signal quality parameter, that a signal quality for an information propagation path including the interface is below a signal quality threshold;
determine, based on the first determination, an information propagation metric for adjusting an information propagation metric quantity;
provide the information propagation metric quantity to an information propagation decision making device; and
the information propagation decision making device, comprising circuitry, and configured to:

program a new information propagation path that does not include the interface into a hardware component of the network device based on receiving the information propagation metric quantity.

18. The system of claim 17, wherein the signal quality analyzer is further configured to, before providing the information propagation metric quantity to the information propagation decision making device:
    add the information propagation metric quantity to the information propagation metric to obtain a new information propagation metric, wherein the information propagation metric quantity is provided to the information propagation decision making device as a portion of the new information propagation metric.

19. The system of claim 17, wherein the information propagation metric quantity is added to the information propagation metric by the information propagation decision making device to obtain a new information propagation metric.

20. The method of claim 1, wherein the signal quality parameter is a pre-forwarding error correction (pre-FEC) bit error rate (BER).

* * * * *